US012722651B2

(12) United States Patent
Huelsmann et al.

(10) Patent No.: US 12,722,651 B2
(45) Date of Patent: Sep. 1, 2026

(54) APPARATUS AND METHOD FOR INFORMING A DRIVER OF A MOTOR VEHICLE HAVING AT LEAST ONE ELECTRIC MOTOR FOR DRIVING AND DECELERATING AN AXLE OF THE MOTOR VEHICLE

(71) Applicant: Bayerische Motoren Werke Aktiengesellschaft, Munich (DE)

(72) Inventors: Florian Huelsmann, Munich (DE); Tobias Kage, Furth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 71 days.

(21) Appl. No.: 18/846,317

(22) PCT Filed: May 23, 2023

(86) PCT No.: PCT/EP2023/063717
§ 371 (c)(1),
(2) Date: Sep. 12, 2024

(87) PCT Pub. No.: WO2023/241887
PCT Pub. Date: Dec. 21, 2023

(65) Prior Publication Data

US 2025/0196879 A1 Jun. 19, 2025

(30) Foreign Application Priority Data

Jun. 14, 2022 (DE) ..................... 10 2022 114 926.9

(51) Int. Cl.
*B60W 50/16* (2020.01)
*B60T 8/17* (2006.01)
*B60W 50/14* (2020.01)

(52) U.S. Cl.
CPC ........... *B60W 50/16* (2013.01); *B60T 8/1706* (2013.01); *B60W 2050/143* (2013.01); *B60W 2300/36* (2013.01)

(58) Field of Classification Search
CPC ................ B60W 50/16; B60W 50/14; B60W 2050/143; B60W 2050/146; B60W 2300/36; B60W 30/18127; B60T 8/1706
See application file for complete search history.

(56) References Cited

U.S. PATENT DOCUMENTS 5,139,115 A * 8/1992 Browne .................. B60Q 1/44 340/463
7,798,578 B2 * 9/2010 Lewis .................. B60W 50/16 340/439

(Continued)

FOREIGN PATENT DOCUMENTS

DE 10 2013 225 751 A1 6/2015
DE 10 2014 214 385 A1 1/2016

(Continued)

OTHER PUBLICATIONS

International Search Report (PCT/ISA/210) issued in PCT Application No. PCT/EP2023/063717 dated Aug. 24, 2023 with English translation (6 pages).

(Continued)

*Primary Examiner* — George C Jin
(74) *Attorney, Agent, or Firm* — Crowell & Moring LLP

(57) ABSTRACT

A method and apparatus are disclosed for informing a driver of a motor vehicle (e.g., a single-track motor vehicle), having at least one electric motor for driving and decelerating an axle of the motor vehicle and a control unit for controlling the electric motor. In the method, a deceleration request is continuously captured at the axle by way of a braking element, an acceleration request is continuously captured at the axle by way of a throttle grip or an accel- (Continued)

erator pedal, and current operating parameters are continuously captured by way of a sensor system. The captured deceleration request and/or acceleration request and/or the captured current operating parameters is/are compared with limit values stored in the control unit. The driver is then informed, using at least one indication or means for informing the driver, if one of the limit values is reached and/or exceeded.

16 Claims, 1 Drawing Sheet

(56) References Cited

U.S. PATENT DOCUMENTS 10,029,683 B1 7/2018 Ginther et al.
12,090,893 B2 * 9/2024 Heseding ................ B60T 7/042
2008/0042489 A1 * 2/2008 Lewis ....................... B60T 1/10 303/152
2014/0309856 A1 * 10/2014 Willson-Quayle ..... B60Q 1/444 701/36
2017/0080938 A1 3/2017 Ohashi et al.
2018/0170472 A1 * 6/2018 Corno .................... B62J 45/414
2019/0077394 A1 3/2019 Ehmann

FOREIGN PATENT DOCUMENTS

DE 10 2014 214 386 A1 1/2016
DE 10 2014 214 388 A1 1/2016
DE 11 2014 006 719 T5 2/2017
DE 10 2018 133 008 A1 6/2020
DE 10 2019 124 339 B3 9/2020
EP 2 789 516 A1 10/2014
KR 100579744 B1 * 5/2006

OTHER PUBLICATIONS

German-language Written Opinion (PCT/ISA/237) issued in PCT Application No. PCT/EP2023/063717 dated Aug. 24, 2023 with English translation (10 pages).
German-language Search Report issued in German Application No. 10 2022 114 926.9 dated Feb. 13, 2023 with partial English translation (24 pages).

* cited by examiner

APPARATUS AND METHOD FOR INFORMING A DRIVER OF A MOTOR VEHICLE HAVING AT LEAST ONE ELECTRIC MOTOR FOR DRIVING AND DECELERATING AN AXLE OF THE MOTOR VEHICLE

BACKGROUND AND SUMMARY

This disclosure relates to an apparatus and a method for informing a driver of a motor vehicle having at least one electric motor for driving and decelerating an axle of the motor vehicle.

Electrical braking systems, in which the function of the service brake on at least one vehicle axle is represented completely by the electric drive motor ("electric motor service brake"), which generates a corresponding braking torque when the brake is actuated by the driver, are the subject matter of the present disclosure. A, for example hydraulically actuated, friction brake according to the prior art is thus dispensed with on the driven axle.

In particular in the case of motorcycles having such a braking system, there are two different brake actuations, in general one for the front wheel brake and one for the rear wheel brake, of which at least one actuation exclusively controls the braking torque of the electric motor service brake. The electric drive implements the sum of the desired braking torque requested via the brake actuation and the desired drive torque requested via the throttle grip or the gas pedal. An essential difference from a conventional braking system results in the event of simultaneous actuation of acceleration and brake: in a conventional braking system, the drive would work against the brake in this case, which is expressed in a tension of the chassis that is clearly perceived by the driver. In contrast, in the case of the electric motor service brake, only a braking or drive torque that is correspondingly smaller in amount is implemented, which is not expressed differently for the driver, however, than if they had only accelerated less strongly, or braked, instead of accelerating and braking simultaneously.

An inadvertent simultaneous actuation of acceleration and brake can therefore easily remain unnoticed by the driver, due to which critical situations can occur, for example if the driver releases the brake and is surprised by the suddenly increasing drive torque.

It is therefore an object of the present disclosure to provide an apparatus and a method for informing a driver of a motor vehicle having at least one electric motor for driving and decelerating an axle of the motor vehicle.

According to the disclosure, a method for informing a driver of an, in particular single-track, motor vehicle, having at least one electric motor for driving and decelerating an axle of the motor vehicle and a control unit for regulating the electric motor is proposed, in which initially a deceleration intention of the driver at the axle is continuously detected by way of a braking element, in particular a brake lever, an acceleration intention of the driver at the axle is continuously detected by way of a throttle grip or gas pedal, and current operating parameters are continuously detected by way of a sensor system. These detected data are transmitted to the control unit. The detected deceleration intention and/or acceleration intention and/or the detected current operating parameters are then compared by way of the control unit to limiting values stored in the control unit. The driver is then informed if at least one of the limiting values is reached and/or exceeded by way of at least one indication or means for informing the driver.

This has the advantage that the driver receives feedback about the operating state of their electric motor service brake, which allows potentially critical driving situations to be prevented.

In one advantageous embodiment variant, it is provided that a limiting value is a simultaneous actuation of the braking element and the throttle grip or gas pedal, wherein the driver is informed upon reaching the limiting value by way of the at least one indication or means for informing. In this way, the driver is informed when they actuate the throttle grip or the gas pedal and the braking element simultaneously.

In one exemplary embodiment of the disclosure, it is provided that the sensor system detects a velocity of the motor vehicle, wherein a limiting value is an actuation of the braking element and a velocity of the motor vehicle greater than 0. The driver is informed here upon reaching the limiting value by way of the at least one indication or means for informing. The driver is thus informed in the event of an actuation of the electric motor service brake while driving.

Furthermore, an embodiment is favorable in which the sensor system detects a velocity of the motor vehicle and a limiting value is an actuation of the braking element and a velocity of the motor vehicle of 0. The driver is informed here upon reaching the limiting value by way of the at least one indication or means for informing. It is favorable in this case that the driver is informed if the electric motor service brake is actuated at a standstill of the motor vehicle.

In a further advantageous variant, it is provided according to the disclosure that the sensor system detects a velocity of the motor vehicle and wherein a limiting value is a velocity of the motor vehicle greater than 0 and an actuation of the braking element such that an intervention of an antilock braking system of the motor vehicle takes place. The driver is informed here upon reaching or exceeding the limiting value by way of the at least one indication or means for informing. This has the advantage that activation of the informing of the driver takes place upon a strong actuation of the electric motor service brake, and so the stability function ("ABS function") has to limit/reduce the braking torque in order to maintain the vehicle stability.

The method according to the disclosure is carried out in one embodiment variant in that the sensor system detects a velocity of the motor vehicle and a limiting value is a velocity of the motor vehicle greater than or equal to 0 and an actuation of the throttle grip or gas pedal such that an intervention of a drive slip control/dynamic traction control (DTC) of the motor vehicle takes place. The driver is informed upon reaching or exceeding the limiting value by way of the at least one indication or means for informing. The driver is thus warned upon or before a spinning drive axle.

In an alternative embodiment of the method, it is furthermore provided that a limiting value is a predetermined operating point, in particular an operating point having a maximum efficiency, of the motor vehicle, which is determined by way of the control unit on the basis of the current operating parameters detected by way of the sensor system, and an actuation of the braking element. The driver is informed upon reaching the limiting value by way of the at least one indication or means for informing. In this way, the driver is informed in the event of an actuation of the electric motor service brake in/below/above a certain operating point.

In one advantageous embodiment variant, it is provided that the indication or means for informing the driver is a torque modulation of the electric motor by way of the control unit and an oscillation and/or vibration of the motor vehicle is generated upon the informing.

The indication or means for informing the driver is preferably an actuator for generating a haptic signal, in particular a vibration motor or a piezoelectric element, which is arranged at the braking element or a steering element of the motor vehicle or a seat element of the motor vehicle, and a vibration of the braking element is generated upon the informing.

In one exemplary embodiment of the disclosure, it is provided that the indication or means for informing the driver is an acoustic signal which is generated by a corresponding regulation of the electric motor by way of the control unit, and the acoustic signal is generated upon the informing.

Furthermore, an embodiment is favorable in which the indication or means for informing the driver is an acoustic signal which is generated by a loudspeaker of the motor vehicle, and the acoustic signal is generated upon the informing.

In a further advantageous variant, it is provided that the indication or means for informing the driver is an optical signal which is generated by a display of the motor vehicle, and the optical signal is generated upon the informing.

It is furthermore advantageous if the informing by way of the at least one indication or means for informing is regulated by the control unit.

It is favorable in this case that the comparing and the regulating of the informing are carried out using the control unit and no further components are required.

In one embodiment of the method, it is provided that an intensity, in particular form, strength, and/or amplitude, of the informing by way of the indication or means for informing is produced on the basis of the current operating parameters detected by way of the sensor system by a comparison of the control unit to corresponding limiting values stored in the control unit for the detected current operating parameters. This has the advantage that the intensity of the informing is adaptable to the respective driving situation.

In one preferred embodiment of the disclosure, when the sensor system detects current operating parameters, it determines a vehicle velocity, a deceleration intention of the driver, a motor speed of the electric motor, a wheel speed of a wheel of the motor vehicle, and/or an operating or driving mode of the motor vehicle. These operating parameters are particularly favorable with respect to an assessment of the informing.

According to the disclosure, an apparatus is furthermore proposed for carrying out a method for informing a driver of an, in particular single-track, motor vehicle, in particular according to the preceding disclosure, having at least one electric motor for driving and decelerating an axle of the motor vehicle, a control unit for regulating the electric motor, a braking element for detecting a deceleration intention of the driver at the axle, a throttle grip or gas pedal for detecting an acceleration intention of the driver at the axle, and a sensor system for detecting current operating parameters. Limiting values for the detected deceleration intention and/or acceleration intention and/or the detected current operating parameters are stored here in the control unit. Furthermore, at least one indicator or means for informing the driver is provided and the driver can be informed if one of the limiting values is reached and/or exceeded.

This has the advantage that the driver receives feedback about the operating state of their electric motor service brake, which allows potentially critical driving situations to be prevented.

The features disclosed above are combinable arbitrarily, providing this is technically possible and they are not contradictory to one another.

BRIEF DESCRIPTION OF THE DRAWING

Other advantageous refinements of the disclosure will be described in more detail hereinafter together with the description of the preferred embodiment of the disclosure on the basis of the FIGURE.

Figure 1:
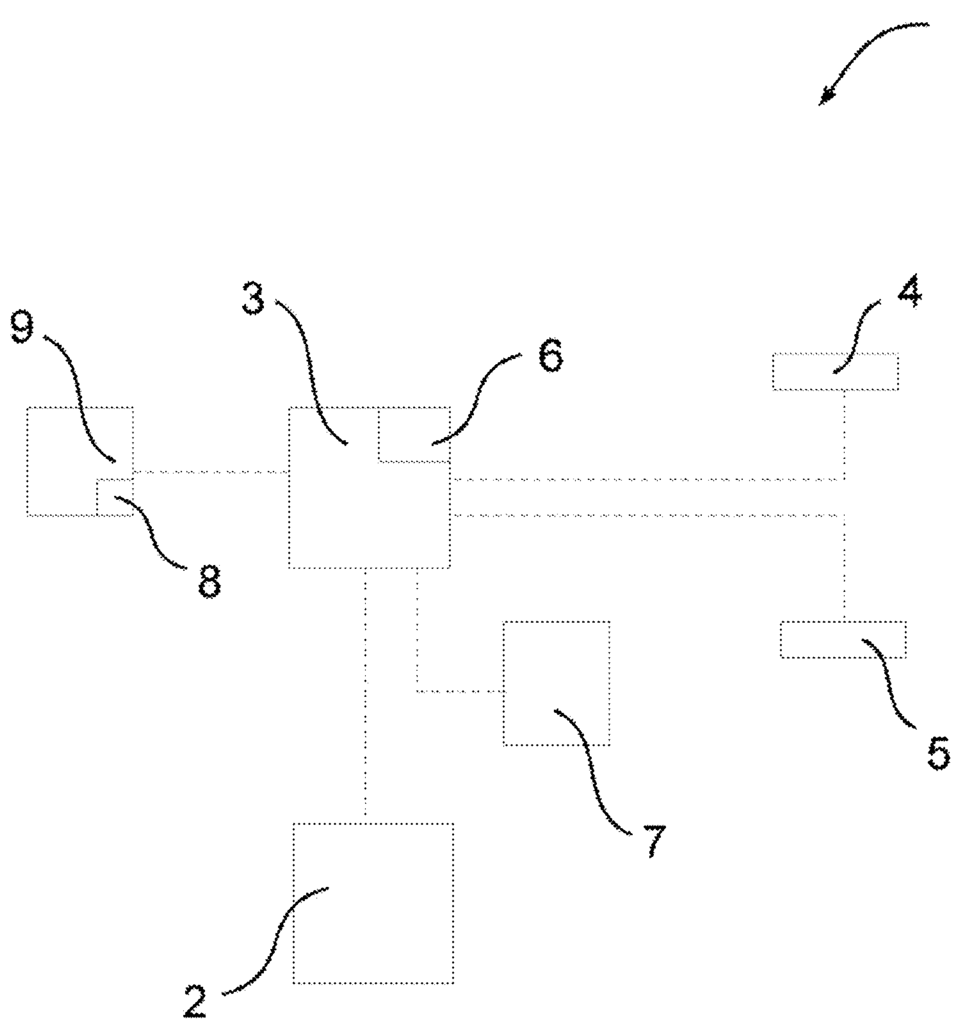
FIG. 1 shows a schematic representation of an apparatus for carrying out a method for informing a driver of a motor vehicle having an electric motor for driving and decelerating an axle of the motor vehicle.

The FIGURE is schematic by way of example.

DETAILED DESCRIPTION OF THE DRAWING

FIG. 1 is a schematic representation of an apparatus 1 for carrying out a method for informing a driver of a single-track motor vehicle having an electric motor for driving and decelerating an axle of the single-track motor vehicle. The apparatus furthermore comprises a control unit 3 for regulating the electric motor 2, a braking element for detecting a deceleration intention of the driver at the axle, a throttle grip for detecting an acceleration intention of the driver at the axle, and a sensor system for detecting current operating parameters. The control unit 3 may comprise a controller, processor, CPU, microprocessor, or the like, along with a memory (e.g., ROM, RAM, hard disk, etc.) for storing software and/or logic to be executed by the control unit 3. In addition, limiting values 6 for the detected deceleration intention and/or acceleration intention and/or the detected current operating parameters 8 are stored in the control unit 3. Moreover, at least one indication or means 7 for informing the driver is provided and the driver can be informed if one of the limiting values 6 is reached and/or exceeded.

When the method is carried out, initially a deceleration intention of the driver at the axle is continuously detected by way of a braking element, an acceleration intention of the driver at the axle is continuously detected by way of a throttle grip, and current operating parameters are continuously detected by way of a sensor system. The detected deceleration intention and/or acceleration intention and/or the detected current operating parameters are then compared to limiting values stored in the control unit. The driver is then informed if one of the limiting values is reached and/or exceeded by way of at least one indication or means for informing the driver.

The sensor system 9 is designed, when detecting current operating parameters 8, to determine a vehicle velocity, a deceleration intention of the driver, a motor speed of the electric motor 2, a wheel speed of a wheel of the single-track motor vehicle, and/or an operating mode or driving mode of the single-track motor vehicle.

A limiting value 6 is a simultaneous actuation of the braking element 4 and the throttle grip 5 here. Further limiting values 6 are an actuation of the braking element 4 and a velocity of the single-track motor vehicle greater than 0; an actuation of the braking element 4 and a velocity of the single-track motor vehicle of 0; a velocity of the single-track motor vehicle greater than 0 and an actuation of the braking element 4 such that an intervention of an antilock braking system of the single-track motor vehicle takes place; a velocity of the single-track motor vehicle greater than or equal to 0 and an actuation of the throttle grip 5 such that an intervention of a drive slip control/dynamic traction control (DTC) of the single-track motor vehicle takes place; and also, a predetermined operating point, in particular an operating point having a maximum efficiency, of the single-track motor vehicle, which is determined by way of the control unit 3 on the basis of the current operating parameters 8 detected by way of the sensor system 9, and an actuation of the braking element 4.

Furthermore, the indication or means 7 for informing the driver is a torque modulation of the electric motor 2 by way of the control unit 3; is a vibration motor or a piezoelectric element which is arranged at the braking element 4; is an acoustic signal which is generated by a corresponding regulation of the electric motor 2 by way of the control unit 3; is an acoustic signal which is generated by a loudspeaker of the single-track motor vehicle; and/or, is an optical signal which is generated by a display of the single-track motor vehicle. The at least one indication or means 7 for informing can be regulated by the control unit 3. In addition, an intensity, in particular a form, strength, and/or amplitude, of the informing can be regulated by way of the means 7 for informing and/or the control unit 2 on the basis of the current operating parameters 8 detected by way of the sensor system 9, and by a comparison of the control unit 3 to corresponding limiting values 6 stored in the control unit 3 for the detected current operating parameters 8.

The disclosure is not restricted in its embodiment to the preferred exemplary embodiments specified above. Rather, a number of variants are conceivable, which make use of the presented solution even in fundamentally different embodiments.

The invention claimed is:

1. A method for informing a driver of a single-track motor vehicle, having at least one electric motor for both driving and decelerating an axle of the motor vehicle via an electric motor service brake in which the service brake function on at least said axial is provided entirely by the electric motor, and a control unit for regulating the electric motor, the method comprising:

continuously detecting a deceleration intention of the driver at the axle by way of a braking element, an acceleration intention of the driver at the axle by way of a throttle grip or gas pedal, and current operating parameters by way of a sensor system, comparing the detected deceleration intention and/or acceleration intention and/or the detected current operating parameters to limiting values stored in the control unit, informing the driver of the operating state of the electric motor service brake if one of the limiting values is reached and/or exceeded.

2. The method according to claim 1, wherein a limiting value is a simultaneous actuation of the braking element and the throttle grip or gas pedal by the driver, wherein the driver is informed upon reaching the limiting value of the simultaneous actuation so that the driver can distinguish the simultaneous actuation from a single-pedal input.

3. The method according to claim 1, wherein the sensor system detects a velocity of the motor vehicle, wherein a limiting value is an actuation of the braking element and a velocity of the motor vehicle greater than 0, wherein the driver is informed upon reaching the limiting value.

4. The method according to claim 1, wherein the sensor system detects a velocity of the motor vehicle, wherein a limiting value is an actuation of the braking element and a velocity of the motor vehicle of 0, wherein the driver is informed upon reaching the limiting value.

5. The method according to claim 1, wherein the sensor system detects a velocity of the motor vehicle, wherein a limiting value is a velocity of the motor vehicle greater than 0 and an actuation of the braking element such that an intervention of an antilock braking system of the motor vehicle takes place, wherein the driver is informed upon reaching or exceeding the limiting value.

6. The method according to claim 1, wherein the sensor system detects a velocity of the motor vehicle, wherein a limiting value is a velocity of the motor vehicle greater than or equal to 0 and an actuation of the throttle grip or gas pedal such that an intervention of a drive slip control/dynamic traction control (DTC) of the motor vehicle takes place, wherein the driver is informed upon reaching or exceeding the limiting value.

7. The method according to claim 1, wherein a limiting value is a predetermined operating point of the motor vehicle having a maximum efficiency, which is determined by the control unit on the basis of the current operating parameters detected by the sensor system, and an actuation of the braking element, wherein the driver is informed upon reaching the limiting value.

8. The method according to claim 1, wherein an indication for informing the driver is a torque modulation of the electric motor by the control unit and an oscillation and/or vibration of the motor vehicle is generated upon the informing.

9. The method according to claim 1, wherein an actuator for generating a haptic signal to inform the driver is arranged at the braking element or a steering element of the motor vehicle or a seat element of the motor vehicle, and a vibration of the braking element is generated upon the informing.

10. The method according to claim 1, wherein an indication for informing the driver is an acoustic signal, which is generated by a corresponding regulation of the electric motor by the control unit, and the acoustic signal is generated upon the informing.

11. The method according to claim 1, wherein an indication for informing the driver is an acoustic signal, which is generated by a loudspeaker of the motor vehicle, and the acoustic signal is generated upon the informing.

12. The method according to claim 1, wherein an indication for informing the driver is an optical signal, which is generated by a display of the motor vehicle, and the optical signal is generated upon the informing.

13. The method according to claim 1, wherein the informing is regulated by the control unit.

14. The method according to claim 13, wherein an intensity, in form, strength, and/or amplitude, of the informing is produced on the basis of the current operating parameters detected by the sensor system, by a comparison of the control unit to corresponding limiting values stored in the control unit, for the detected current operating parameters.

15. The method according to claim 14, wherein the sensor system determines a vehicle velocity, a deceleration intention of the driver, a motor speed of the electric motor, a wheel speed of a wheel of the motor vehicle, and/or an operating/driving mode of the motor vehicle upon the detection as current operating parameters.

16. An apparatus for carrying out a method for informing a driver of a single-track motor vehicle according to claim 1, the apparatus comprising:

at least one electric motor for both driving and decelerating an axle of the motor vehicle via an electric motor service brake, a control unit for regulating the electric motor, a braking element for detecting a deceleration intention of the driver at the axle, a throttle grip or gas pedal for detecting an acceleration intention of the driver at the axle, and a sensor system for detecting current operating parameters, wherein limiting values for the detected deceleration intention and/or acceleration intention and/or the detected current operating parameters are stored in the control unit, wherein at least one indication for informing the driver of the operating state of the electric motor service brake is provided, and the driver can be informed if one of the limiting values is reached and/or exceeded.

* * * * *